United States Patent
Jensen

(10) Patent No.: US 12,500,336 B2
(45) Date of Patent: Dec. 16, 2025

(54) SYSTEM AND METHOD FOR CALIBRATING TRANSMIT ANTENNA ARRAY

(71) Applicant: Rockwell Collins, Inc., Cedar Rapids, IA (US)

(72) Inventor: Dana J. Jensen, Marion, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 307 days.

(21) Appl. No.: 18/223,415

(22) Filed: Jul. 18, 2023

(65) Prior Publication Data

US 2025/0030490 A1     Jan. 23, 2025

(51) Int. Cl.
*H01Q 3/26*     (2006.01)
*H04B 17/12*     (2015.01)

(52) U.S. Cl.
CPC ............ *H01Q 3/267* (2013.01); *H04B 17/12* (2015.01)

(58) Field of Classification Search
CPC ................................ H04B 17/12; H01Q 3/267
See application file for complete search history.

(56) References Cited

U.S. PATENT DOCUMENTS

| | | | |
|---|---|---|---|
| 3,378,846 A | | 4/1968 | Oscar |
| 4,517,570 A | * | 5/1985 | Gray, Jr. ................. H01Q 3/267 342/372 |
| 5,530,449 A | * | 6/1996 | Wachs .................... H01Q 3/267 342/372 |
| 5,677,696 A | | 10/1997 | Silverstein et al. |
| 5,809,087 A | * | 9/1998 | Ashe ....................... H01Q 3/267 342/174 |
| 6,339,399 B1 | | 1/2002 | Andersson et al. |
| 7,570,211 B1 | | 8/2009 | Jensen et al. |

(Continued)

FOREIGN PATENT DOCUMENTS

EP     3704820 B1 *     4/2022     ......... H04L 27/2613

OTHER PUBLICATIONS

J. M. Loomis, "Digital Beamforming—A Retrospective," 2019 IEEE International Symposium on Phased Array System & Technology (PAST), Waltham, MA, USA, 2019, pp. 1-4 (Year: 2019).*

(Continued)

*Primary Examiner* — Cassi J Galt
(74) *Attorney, Agent, or Firm* — Suiter Swantz IP

(57) ABSTRACT

A system may include a digital beam forming (DBF) antenna array including antenna radiating elements including a first and second antenna radiating elements. The DBF antenna array may be configured to: simultaneously transmit a set of calibration signals on multiple antenna radiating elements, the multiple antenna radiating elements including the first and second antenna radiating elements, each calibration signal of the set of calibration signals comprising a given timing acquisition sequence and a given second sequence, the given second sequence used to measure a phase and a gain of a given antenna radiating element; transmit a first calibration signal of the set by the first antenna radiating element; transmit a second calibration signal of the set by the second antenna radiating element; and calibrate the multiple antenna radiating elements by using an estimated relative phase and an estimated relative gain for each of the multiple antenna radiating elements.

14 Claims, 11 Drawing Sheets

(56) References Cited

U.S. PATENT DOCUMENTS

| | | | |
|---|---|---|---|
| 7,609,206 | B1 | 10/2009 | Jensen et al. |
| 9,360,549 | B1 | 6/2016 | Liu |
| 9,979,084 | B2 | 5/2018 | Sikina et al. |
| 10,680,726 | B2 | 6/2020 | Shim et al. |
| 10,971,815 | B1 | 4/2021 | West et al. |
| 10,972,195 | B1 | 4/2021 | Yao et al. |
| 11,581,958 | B2 | 2/2023 | Jayasimha et al. |
| 12,149,336 | B2 * | 11/2024 | Bellemare ........... H04J 13/0048 |
| 2011/0006949 | A1 | 1/2011 | Webb |
| 2013/0016003 | A1 | 1/2013 | Stirling-Gallacher et al. |
| 2020/0389285 | A1 * | 12/2020 | Nuimura ................ G01R 29/10 |
| 2021/0028869 | A1 * | 1/2021 | Hao ..................... H04B 17/104 |
| 2022/0190976 | A1 * | 6/2022 | Mikaelsson ....... H04W 56/0045 |

OTHER PUBLICATIONS

"Gold Code" Wikipedia; https://en.wikipedia.org/w/index.php?title=Gold_code&oldid=1058376167.

European Search Report received in EP Application No. 24189233.0, Dec. 16, 2024, 8 pages.

Vagle Niranjan et al: "Performance of Antenna Array Calibration in Multipath Environments", ITM 2016—Proceedings of the 2016 International Technical Meeting of the Institute of Navigation, The Institute of Navigation, 8551 Rixlew Lane Suite 360 Manassas, VA 20109, USA, Jan. 28, 2016 (Jan. 28, 2016), pp. 784-792m XP056018831, * section: Introduction, Methodology Signal and System Model, Simulation Results *.

* cited by examiner

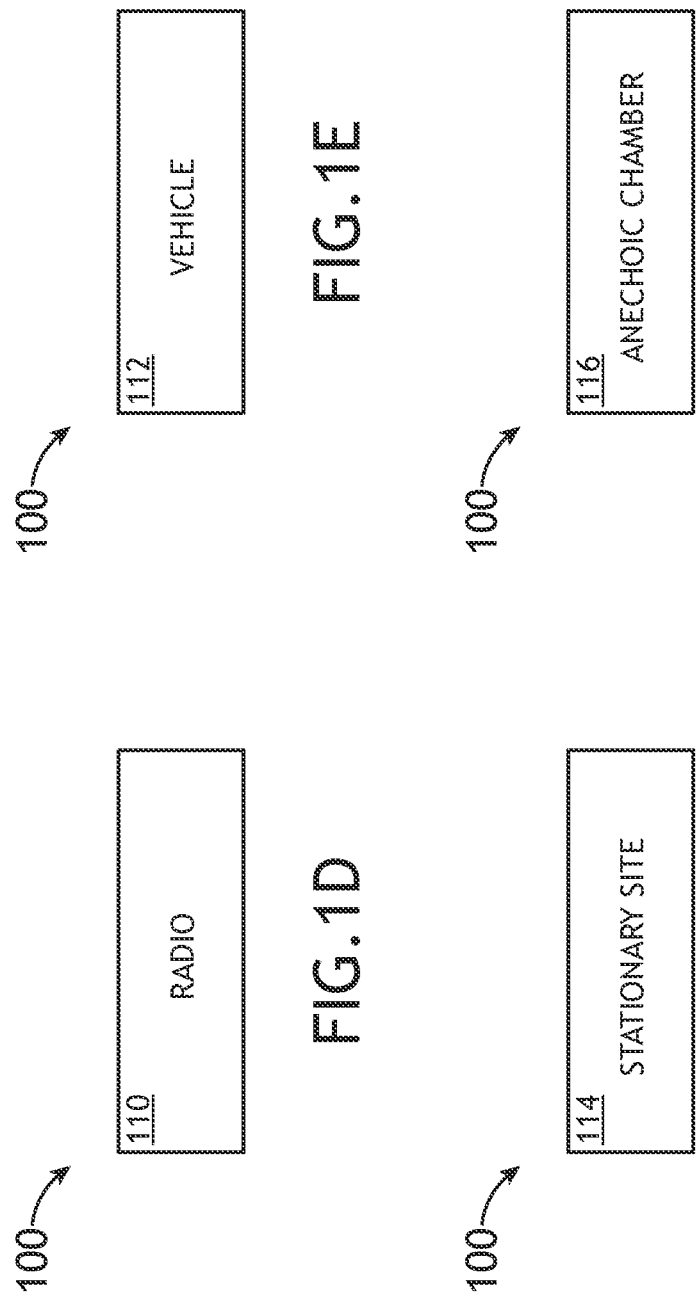

SYSTEM AND METHOD FOR CALIBRATING TRANSMIT ANTENNA ARRAY

BACKGROUND

Antenna technology is rapidly progressing in the area of antenna arrays (e.g., active phased array antennas, commonly referred to as electronically steered antennas (ESAs)), that employ either digital or analog beamforming technologies to control the gain and phase settings of individual antenna elements (e.g., antenna radiating elements) in order to electronically steer the resulting beam. This physical arrangement of many small beam forming devices in a single system allows for functionality that previously required larger passive (e.g., slotted waveguide) antennas, accompanied by mechanical hardware, to physically point the antenna at a target location. Among other advantages in signal processing (such as dual polarization and utilizing multiple beams) this technology also improves control over directionality. Along with this new technology comes new challenges for system calibration of ESAs. Calibration is a necessary process for accurate performance and compensation of manufacturing variations.

Existing methods to calibrate ESAs use Near Field (NF) and Far Field (FF) approaches. Both of these require anechoic chambers of significant facility size with accurate positioning systems to translate receiver and emitter sources (e.g., an electromagnetic field probe) across known coordinate space relative to the ESA. Both are time consuming processes to complete.

Typically, calibration of digital beam forming (DBF) antenna arrays uses a measurement of a relative phase and gain offset per transmit antenna radiating element (or subarray of elements). For DBF antenna arrays, each antenna radiating element (or subarray) can transmit a different signal. A DBF antenna array differs from an analog beam forming (ABF) antenna array, where typically a single signal is distributed to each element (or subarray) with the ABF components adjusting phase and gain.

Currently, standard transmit ESA calibration can be relatively slow and require expensive and specialized test equipment. Currently, standard transmit ESA calibration requires a complex configuration for coordinating a timing, clock, and/or trigger between a transmit DBF antenna array and a receive device.

SUMMARY

In one aspect, embodiments of the inventive concepts disclosed herein are directed to a system. The system may include a digital beam forming (DBF) antenna array comprising antenna radiating elements, the antenna radiating elements comprising a first antenna radiating element and a second antenna radiating element. The DBF antenna array may be configured to: simultaneously transmit a set of calibration signals on multiple antenna radiating elements of the antenna radiating elements, the multiple antenna radiating elements comprising the first and second antenna radiating elements, each calibration signal of the set of calibration signals comprising a given timing acquisition sequence and a given second sequence, the given second sequence used by at least one first processor to measure a phase and a gain of a given antenna radiating element of the antenna radiating elements; transmit a first calibration signal of the set of calibration signals by the first antenna radiating element; transmit a second calibration signal of the set of calibration signals by the second antenna radiating element; and calibrate the multiple antenna radiating elements by using an estimated relative phase and an estimated relative gain for each of the multiple antenna radiating elements, wherein the estimated relative phase and the estimated relative gain for each of the multiple antenna radiating elements are obtained from the at least one first processor.

In a further aspect, embodiments of the inventive concepts disclosed herein are directed to a method. The method may include: simultaneously transmitting, by a digital beam forming (DBF) antenna array comprising antenna radiating elements, a set of calibration signals on multiple antenna radiating elements of the antenna radiating elements, the antenna radiating elements comprising a first antenna radiating element and a second antenna radiating element, the multiple antenna radiating elements comprising the first and second antenna radiating elements, each calibration signal of the set of calibration signals comprising a given timing acquisition sequence and a given second sequence, the given second sequence used by at least one first processor to measure a phase and a gain of a given antenna radiating element of the antenna radiating elements; transmitting, by the DBF antenna array, a first calibration signal of the set of calibration signals by the first antenna radiating element; transmitting, by the DBF antenna array, a second calibration signal of the set of calibration signals by the second antenna radiating element; and calibrating, by the DBF antenna array, the multiple antenna radiating elements by using an estimated relative phase and an estimated relative gain for each of the multiple antenna radiating elements, wherein the estimated relative phase and the estimated relative gain for each of the multiple antenna radiating elements are obtained from the at least one first processor.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings:

FIGS. 1A, 1B, 1C, 1D, 1E, 1F, and 1G are views of an exemplary embodiment of a system according to the inventive concepts disclosed herein.

DETAILED DESCRIPTION

Figure 1A:
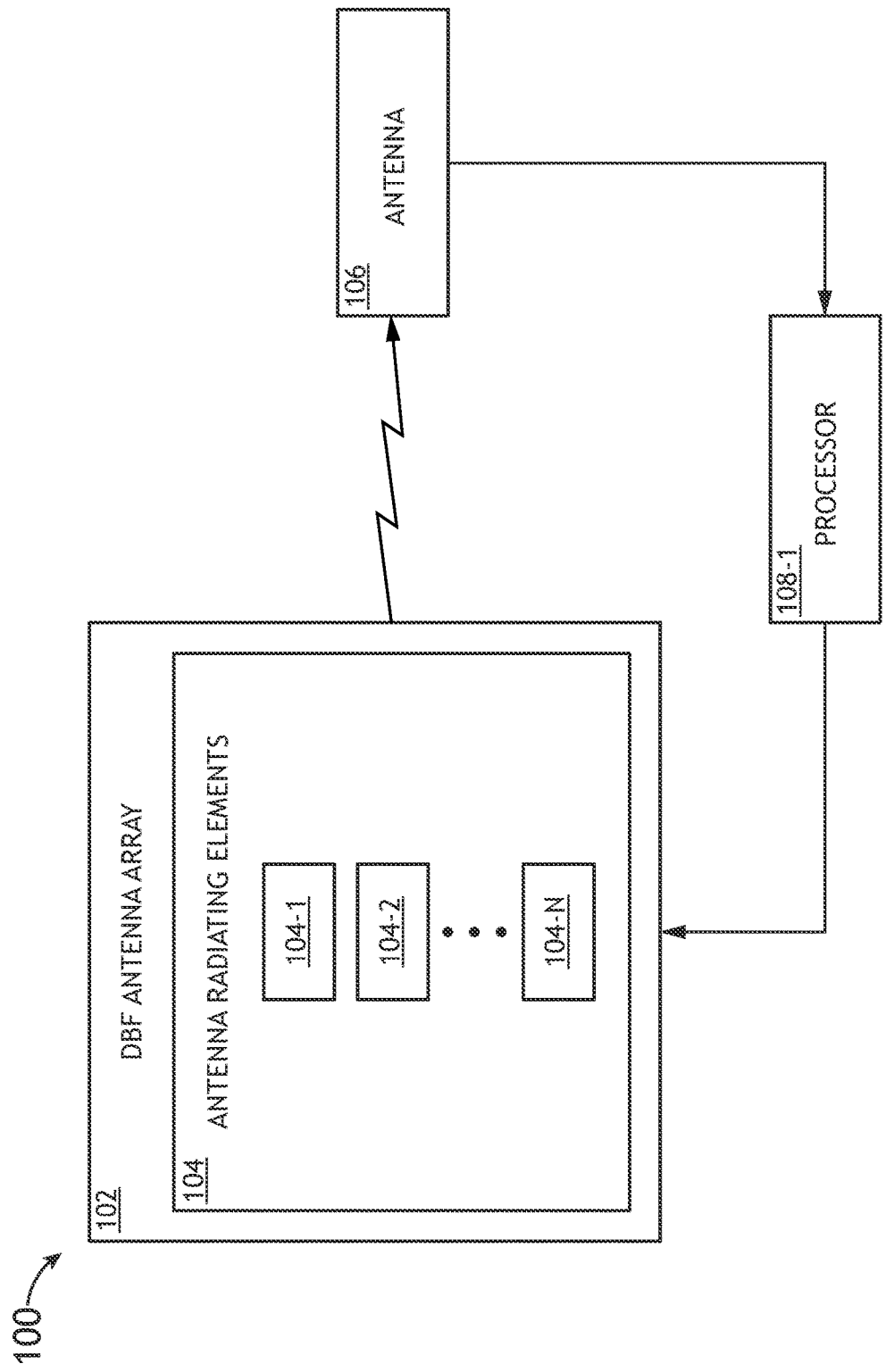

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination or sub-combination of two or more such features, along with any other features which may not necessarily be expressly described or inherently present in the instant disclosure.

Broadly, embodiments of the inventive concepts disclosed herein are directed to a method and a system configured to calibrate a transmit antenna array (e.g., a digital beam forming (DBF) antenna array or an analog beam forming (ABF) antenna array; e.g., an active phased array antenna, commonly referred to as an ESA).

Some embodiments may provide a fast and flexible transmit DBF antenna array calibration procedure. Some embodiments may provide a fast and flexible transmit ABF antenna array calibration procedure, which may be similar to the DBF embodiments disclosed throughout. Some embodiments may provide a calibration procedure that does not require specialized and/or expensive test equipment.

Some embodiments scale with a number of antenna radiating elements of a DBF antenna array; for example, a set of calibration sequences may be longer to accommodate a relatively higher number of antenna radiating elements. In some embodiments, longer calibration signals can be used, for example, which may be useful for field calibration where noise and/or interference may affect results.

Some embodiments may provide support for calibration in varied conditions and/or scenarios. In some embodiments, a calibration may occur in an anechoic chamber, using any suitable equipment configuration. Some embodiments may include a field calibration. For example, a field calibration may include a calibration occurring between (a) a transmit DBF antenna array installed on one of a moving platform (e.g., a satellite, a vehicle (e.g., an aircraft, watercraft, spacecraft, and/or automobile)) or a stationary site (e.g., a cell tower, an air traffic control tower, a radio access network (RAN), a network operations center (NOC) (e.g., a satellite communication (SatCom) NOC), a wireless router, or a wireless access point) and (b) an antenna installed on one of another moving platform or another stationary site. In some embodiments, a field calibration can be a self-calibration, whereby the transmit DBF antenna array and the antenna are installed on a same platform, such as on a same mobile platform or a same stationary site. In some embodiments, a field calibration can be a cooperative calibration, whereby the transmit DBF antenna array is installed on a first platform (e.g., a moving platform or at a stationary site) and an antenna is installed on a second platform (e.g., another moving platform or at another stationary site).

Some embodiments may include a fast procedure to calibrate a transmit DBF antenna array. In some embodiments, a calibration (e.g., a field calibration or an anechoic chamber calibration) can occur in real-time (e.g., within 20 microseconds, within 1 millisecond, within 0.5 seconds, within 1 second, within 10 seconds, and/or within one minute).

In some embodiments, a DBF antenna array may be configured to transmit (e.g., simultaneously transmit) a different signal from each of multiple or all of the elements (e.g., antenna radiating element) or of subarrays of elements (e.g., the DBF antenna array may have multiple subarrays of elements, wherein each subarray transmits a different signal). In some embodiments, the DBF antenna array may simultaneously transmit (e.g., to a receive device (e.g., including an antenna, at least one processor, at least one receive buffer, a receiver, and/or a radio)) a set of calibration signals on multiple antenna radiating elements of the antenna radiating element. In some embodiments, the DBF antenna array transmits the set of calibration signals on all elements (or subarrays) of the DBF antenna array simultaneously (as opposed to a single element or partial array). The set of calibration signals may be transmitted on any suitable waveform. Each calibration signal of the set of calibration signals may include two or more sequences, such as a given timing acquisition sequence and a given second sequence. In some embodiments, the given timing acquisition sequence may be used for acquiring calibration signal timing alignment between the DBF antenna array and the receive device. In some embodiments, the timing acquisition sequences of the set of calibration signals may have (a) good autocorrelation properties to have a distinct correlation peak and/or (b) good cross-correlation properties such that self-interference from different codes does not compromise an ensemble correlation peak. For example, the given timing acquisition sequence of the given calibration signal may include a Gold code (unlike orthogonal codes (e.g., Hadamard codes), which have poor autocorrelation properties). In some embodiments, the given second sequence may be used to measure a phase (e.g., a relative phase) and a gain (e.g., a relative gain) of a given antenna radiating element of the antenna radiating elements. For example, the given second sequence may include at least one given orthogonal code. In some embodiments, the set of calibration signals may have a constant envelope modulation, which may have many desirable qualities for calibration. In some embodiments, during the calibration process, each element (or subarray) may repeatedly transmit (e.g., loop on) its calibration signal, e.g., such that DBF antenna array repeatedly transmits the set (e.g., the same set) of calibration signals. In some embodiments including repeated sets of calibration signals, a transmit duty cycle may be reduced by pausing between a transmission of each set of calibration signals. In some embodiments, repeated sets of calibration signals can be transmitted in a burst mode, for example, if the transmit DBF antenna array is unable to continuously transmit.

In some embodiments, a receive device (e.g., including an antenna, at least one processor, at least one receive buffer a receiver, and/or a radio) receives, captures, and/or operates (e.g., in real-time) on the set of calibration signals. The timing acquisition sequences may be used to acquire timing on the waveform. The timing may be used to extract the second sequences and measure relative phase and gain for each of the elements or of subarrays of elements of the DBF antenna array. In some embodiments, no timing or trigger signals need to be exchanged between the DBF antenna array and the receive device. For example, some embodiments do not require clocks at the DBF antenna array and the receive device to be locked and/or trigger signals to be distributed.

In some embodiments, the receive device may be any suitable device capable of receiving the set of calibration signals, capturing the set of calibration signals, processing (and/or post processing) a waveform associated with the set of calibration signals and/or the set of calibration signals, and/or capturing samples for post-processing. For example, the receive device may include or may be any suitable antenna, at least one processor, at least one receive buffer, a receiver, and/or a radio (e.g., which may include at least one processor). In some embodiments, the receive device does not need to have DBF capabilities; though, in some embodiments, the receive device may include a DBF antenna array.

In some embodiments, the DBF antenna array may be configured to self-calibrate. For example, the DBF antenna array may include at least one calibration support circuit configured to route a copy of the set of calibration signals to at least one processor. For example, the at least one calibration support circuit may be electrically positioned between (a) the multiple antenna radiating elements and (b) one of (i) one processor (e.g., a radio frequency (RF) system on chip (SOC) and/or RF processor) of the at least one first processor or (ii) a device (e.g., processor (e.g., an RF SOC and/or RF processor) and/or a radio); the one processor or the device may be configured to feed the set of calibration signals to the multiple antenna radiating elements.

In some embodiments, the DBF antenna array may be configured to transmit the set of calibration signals via a constant envelope waveform. For example, a constant envelope waveform may allow for a maximum transmit power (e.g., which may be important for field calibration where range may be an issue) with minimal and/or non-existent distortion. For example, a constant envelope waveform may avoid distortion introduced with high peak-to-average ratio (PAPR) waveforms. For example, a constant envelope waveform may avoid a power loss that would otherwise be caused by a back off into a linear region.

Referring now to FIGS. 1A-1G, exemplary embodiments of a system 100 according to the inventive concepts disclosed herein are depicted. The system 100 may be implemented as any suitable system. For example, as shown in FIG. 1A-1G, the system 100 may include a DBF antenna array 102, an antenna 106 (e.g., an ESA antenna or a non-ESA antenna), at least one first processor 108-1, at least one second processor 108-2, at least one radio 110, at least one vehicle 112, at least one stationary site 114, at least one anechoic chamber 116, at least one power amplifier (not shown), at least one low noise amplifier (LNA) (e.g., 122 of FIG. 2A), and/or at least one receive buffer (e.g., at least one receive (rx) capture buffer 124 of FIG. 2A), some or all of which may be communicatively coupled at any given time.

The DBF antenna array 102 may be any suitable antenna array configured for DBF, such as an ESA (e.g., an active ESA (AESA)). In some embodiments, the DBF antenna array may include a plurality (e.g., an array) of antenna radiating elements 104-1, 104-2, 104-3, 104-4, . . . 104-N (which may be collectively and/or generally referred to as "antenna radiating elements 104" throughout), a plurality (e.g., an array) of radiofrequency (RF) digital-to-analog converters (DACs) 118-1, 118-2, 118-3, 118-4, . . . , etc. (which may be collectively and/or generally referred to as "RFDACs 118" throughout), and/or at least one buffer (e.g., an array 120 of DAC playback buffers), some or all of which may be communicatively coupled at any given time. For example, each buffer of the array 120 of DAC playback buffers may be communicatively coupled to one of the RFDACs 118. For example, each of the RFDACs 118 may be communicatively coupled to one of the antenna radiating elements 104. For example, the antenna radiating elements 104 may include a first antenna radiating element 104-1 and a second antenna radiating element 104-2, as well as any suitable number of other antenna radiating elements. In some embodiments, such as exemplarily shown in FIG. 1C, the DBF antenna array 102 may further include at least one calibration support circuit 138 configured to route a copy of a set of calibration signals to the at least one first processor 108-1. For example, the at least one calibration support circuit 138 may be electrically positioned between (a) the multiple antenna radiating elements 104 and (b) one or more of the at least one first processor 108-1.

Figure 1B:
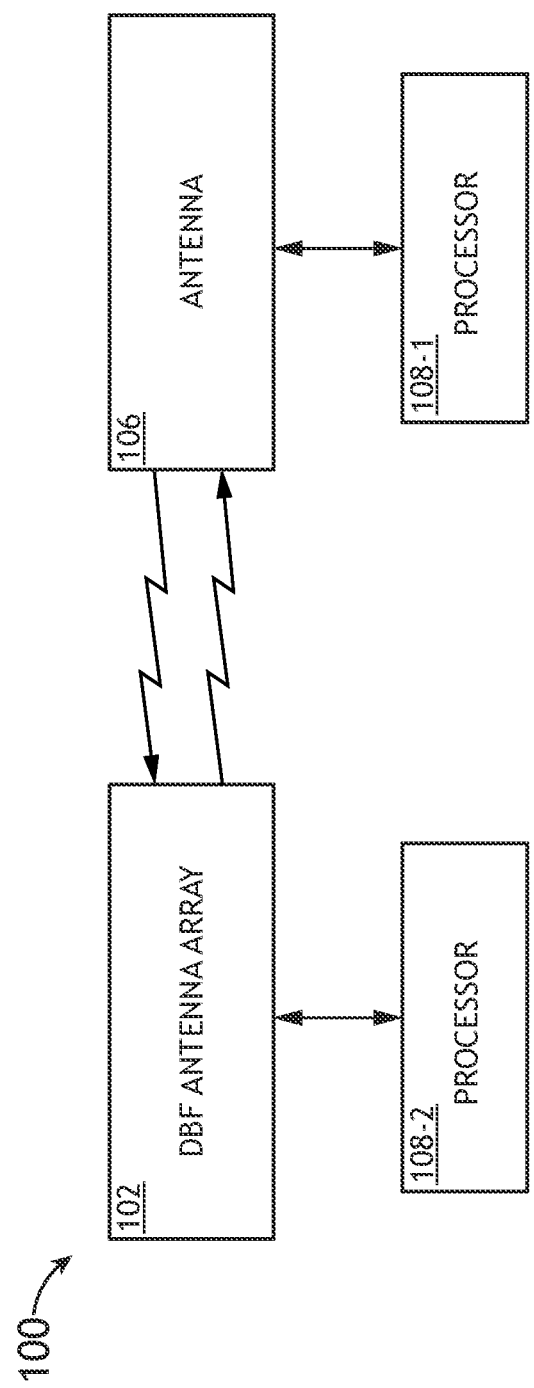

The at least one first processor 108-1 may be implemented as any suitable type and number of processors. For example, the at least one first processor 108-1 may include at least one radiofrequency (RF) processor, at least one RF system on chip (SOC), at least one general purpose processor (e.g., at least one central processing unit (CPU)), at least one digital signal processor (DSP), at least one application specific integrated circuit (ASIC), and/or at least one field-programmable gate array (FPGA). The at least one processor 108-1 may be configured to perform (e.g., collectively perform if more than one processor) any or all of the operations disclosed throughout. The at least one first processor 108-1 may be configured to run various software and/or firmware applications and/or computer code stored (e.g., maintained) in a non-transitory computer-readable medium (e.g., memory) and configured to execute various instructions or operations. In some embodiments (such as shown in FIG. 1A), the at least one first processor 108-1 may be communicatively coupled between the antenna 106 and the DBF antenna array 102; for example, in some of such embodiments, the at least one first processor 108-1 may be electrically and/or optically communicatively coupled between the antenna 106 and the DBF antenna array 102. In some embodiments (such as shown in FIG. 1B), the at least one first processor 108-1 (e.g., which may be included in a first radio of the at least one radio 110) may be electrically and/or optically communicatively coupled to the antenna 106 but may not be electrically and/or optically communicatively coupled to the at least one second processor 108-2 (e.g., which may be included in a second radio of the at least one radio 110). In some embodiments, one of the at least one radio 110 may include the at least one first processor 108-1. In some embodiments, a computing device (e.g., a personal computer (PC) or a laptop computer) (not shown) may include the at least one first processor 108-1.

The at least one second processor 108-2 may be implemented as any suitable type and number of processors. For example, the at least one second processor 108-2 may include at least one radiofrequency (RF) processor, at least one RF system on chip (SOC), at least one general purpose processor (e.g., at least one central processing unit (CPU)), at least one digital signal processor (DSP), at least one application specific integrated circuit (ASIC), and/or at least one field-programmable gate array (FPGA). The at least one second processor 108-2 may be configured to perform (e.g., collectively perform if more than one processor) any or all of the operations disclosed throughout. The at least one second processor 108-2 may be configured to run various software and/or firmware applications and/or computer code stored (e.g., maintained) in a non-transitory computer-readable medium (e.g., memory) and configured to execute various instructions or operations. In some embodiments (such as shown in FIG. 1B), the at least one second processor 108-2 (e.g., which may be included in a second radio of the at least one radio 110) may be electrically and/or optically communicatively coupled to the DBF antenna array 102 but may not be electrically and/or optically communicatively coupled to the at least one first processor 108-1 (e.g., which may be included in a first radio of the at least one radio 110). In some embodiments, one of the at least one radio 110 may include the at least one second processor 108-2. In some embodiments, a computing device (e.g., a personal computer (PC) or a laptop computer) (not shown) may include the at least one second processor 108-2.

The at least one radio 110 (e.g., of FIG. 1D) may include any suitable type and number of radio(s), such as at least one software-defined radio (SDR) and/or at least one non-SDR. In some embodiments (such as shown in FIG. 1A), a first radio (e.g., including the at least one first processor 108-1) of the at least one radio 110 may be communicatively coupled between the antenna 106 and the DBF antenna array 102; for example, in some of such embodiments, first radio may be electrically and/or optically communicatively coupled between the antenna 106 and the DBF antenna array 102. In some embodiments (such as shown in FIG. 1B), a first radio (e.g., including the at least one first processor 108-1) of the at least one radio 110 may be electrically and/or optically communicatively coupled to the antenna 106 but may not be electrically and/or optically communicatively coupled to a second radio (e.g., including the at least one second processor 108-2) of the at least one radio 110. In some embodiments, one of the at least one radio 110 may include the at least one first processor 108-1 and/or another of the at least one radio 110 may include the at least one second processor 108-2.

Figure 1C:
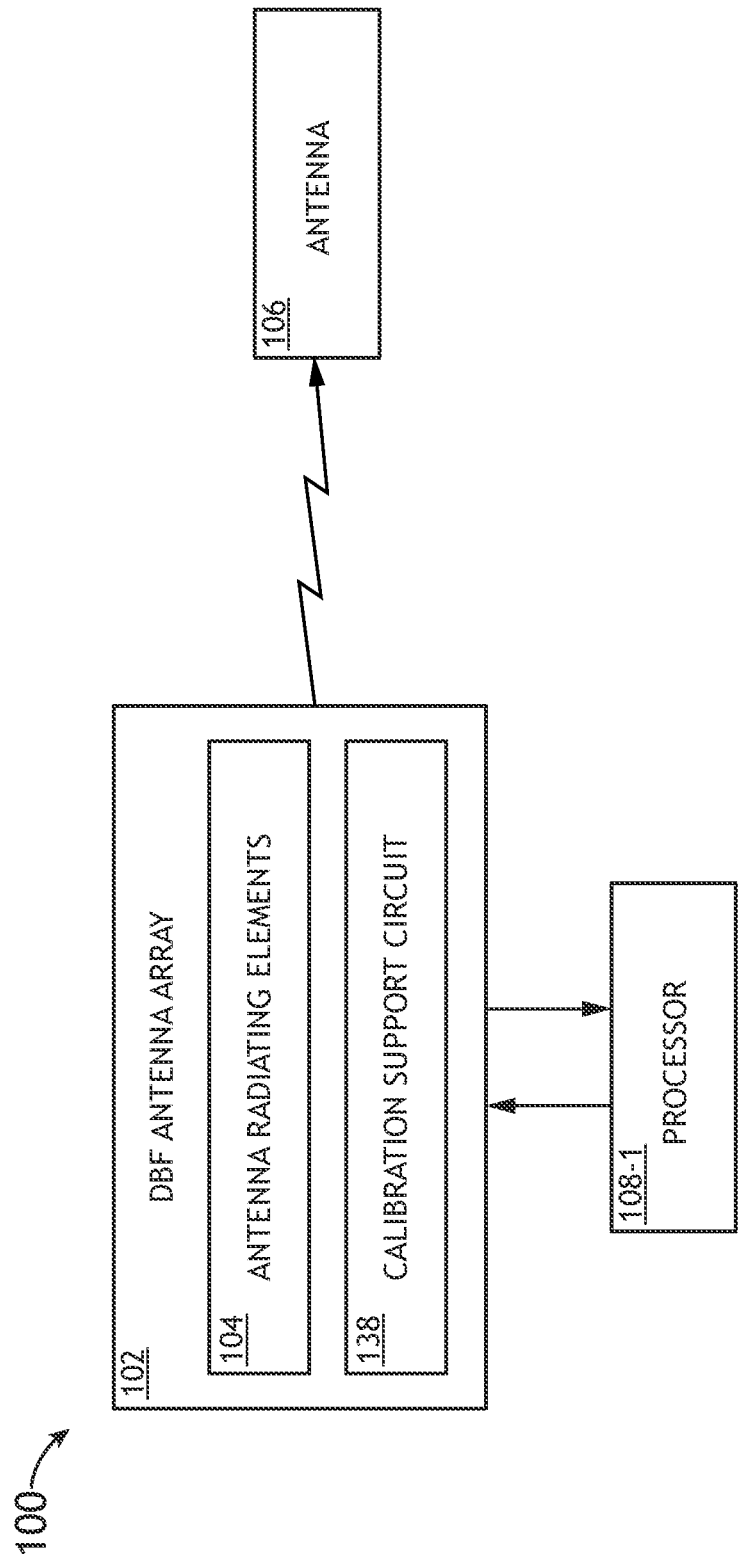

The at least one vehicle 112 (e.g., of FIG. 1D) may include any suitable type and number of vehicle(s) (e.g., at least one aircraft, at least one watercraft, at least one spacecraft, at least one satellite, and/or at least one automobile). Referring by way of example to FIG. 1B, in some embodiments, one of the at least one vehicle 112 may include the at least one second processor 108-2 and the DBF antenna array 102, and/or another of the at least one vehicle 112 may include the at least one first processor 108-1 and the antenna 106. Referring by way of example to FIG. 1C, in some embodiments, one of the at least one vehicle 112 may include the at least one first processor 108-1 and the DBF antenna array 102, and/or another of the at least one vehicle 112 may include the antenna 106.

The at least one stationary site 114 may include any suitable type and number of stationary site(s) (e.g., an anechoic chamber 116, at least one cell tower, at least one air traffic control tower, at least one radio access network (RAN), at least one network operations center (NOC) (e.g., at least one satellite communication (SatCom) NOC), at least one wireless router, and/or at least one wireless access point). Referring by way of example to FIG. 1A, in some embodiments, a stationary site 114 may include the DBF antenna array 102, the at least one first processor 108-1, and the antenna 106. Referring by way of example to FIG. 1B, in some embodiments, one of the at least one stationary site 114 may include the at least one second processor 108-2 and the DBF antenna array 102, and/or another of the at least one stationary site 114 may include the at least one first processor 108-1 and the antenna 106. Referring by way of example to FIG. 1C, in some embodiments, one of the at least one stationary site 114 may include the at least one first processor 108-1 and the DBF antenna array 102, and/or another of the at least one stationary site 114 may include the antenna 106.

The at least one anechoic chamber 116 may include any suitable type and number of anechoic chamber(s). Referring by way of example to FIG. 1A, in some embodiments, an anechoic chamber 116 may include the DBF antenna array 102, the at least one first processor 108-1, and the antenna 106. Referring by way of example to FIG. 1B, in some embodiments, an anechoic chamber 116 may include the at least one second processor 108-2, the DBF antenna array 102, the at least one first processor 108-1, and the antenna 106. Referring by way of example to FIG. 1C, in some embodiments, an anechoic chamber 116 may include the at least one first processor 108-1, the DBF antenna array 102, and the antenna 106.

In some embodiments, the DBF antenna array 104 may be configured to: simultaneously transmit, to an antenna 106 and/or at least one calibration support circuit 138, a set of calibration signals on multiple antenna radiating elements 104 of the antenna radiating elements 104, the multiple antenna radiating elements 104 including the first and second antenna radiating elements 104-1, 104-2, each calibration signal of the set of calibration signals including a given timing acquisition sequence and a given second sequence, the given second sequence used by at least one first processor 108-1 to measure a phase and a gain of a given antenna radiating element 104 of the antenna radiating elements 104; transmit, to the antenna 106 and/or the at least one calibration support circuit 138, a first calibration signal of the set of calibration signals by the first antenna radiating element 104-1; transmit, to the antenna 106 and/or the at least one calibration support circuit 138, a second calibration signal of the set of calibration signals by the second antenna radiating element 104-2; and/or calibrate the multiple antenna radiating elements 104 by using an estimated relative phase and an estimated relative gain for each of the multiple antenna radiating elements, wherein the estimated relative phase and the estimated relative gain for each of the multiple antenna radiating elements are obtained from the at least one first processor 108-1.

In some embodiments, a timing acquisition sequence of each calibration signal of the set of calibration signals may include a Gold code. In some embodiments, one or some of the timing acquisition sequences of the set of calibration signals may include a Gold code(s). For example, a timing acquisition sequence of the first calibration signal may include a first Gold code, and other timing acquisition sequence(s) of the set of calibration signals may include a tone(s). For example, a timing acquisition sequence of the first calibration signal includes a first Gold code, and a timing acquisition sequence of the second calibration signal includes a tone and lacks a Gold code.

In some embodiments, each second sequence includes at least one given orthogonal code (e.g., at least one Hadamard code).

In some embodiments, the DBF antenna array 102 and the antenna 106 are not time synchronized.

In some embodiments, the set of calibration signals may have a constant envelope waveform.

In some embodiments, the DBF antenna array 102 may be further configured to repeatedly transmit (e.g., in a loop), to the antenna 106, sets of calibration signals (e.g., at least until the DBF antenna array 102 obtains the estimated relative phase and the estimated relative gain for each of the multiple antenna radiating elements). For example, each of the sets of calibration signals may be the same as the set of calibration signals.

In some embodiments, the DBF antenna array 102 or the antenna 106 is in motion relative to the other of the DBF antenna array 102 and the antenna 106. For example, the calibration of the multiple antenna radiating elements 104 by using the estimated relative phase and the estimated relative gain for each of the multiple antenna radiating elements 104 may take into account a frequency offset resulting from the relative motion and/or an orientation between the DBF antenna array 102 and the antenna 106. An example of such frequency offset can also be due to transmit and receive using separate local oscillators that are not locked together, which may be relevant for the case of field calibration, cooperative calibration, etc. any time transmit and receive are not sharing or locking their clocks and/or oscillators.

In some embodiments, the DBF antenna array 102 or the antenna 106 may be installed on a vehicle 112. For example, the other of the DBF antenna array 102 and the antenna 106 may be installed on another vehicle 112.

In some embodiments, the DBF antenna array 102 may be further configured to perform a field calibration of the multiple antenna radiating elements 104 by using the estimated relative phase and the estimated relative gain for each of the multiple antenna radiating elements 104.

In some embodiments, the calibration of the multiple antenna radiating elements 104 may occur in real-time relative to the transmission of the set of calibration signals by the DBF antenna array 102.

In some embodiments, each timing acquisition sequence includes a given Gold code, and each second sequence includes at least one given code (e.g., at least one given orthogonal code). In some embodiments, the at least one first processor 108-1 may be communicatively coupled to the antenna 106. For example, the at least one first processor 108-1 may be configured to: receive the set of calibration signals from the antenna 106; acquire a timing of all of the Gold codes within the set of calibration signals; at least by using the timing of all of the Gold codes, extract a code sample from each of the at least one given code for each second sequence; despread the code samples to recover at least one given sampled phase and at least one given sampled gain for each of the multiple antenna radiating elements 104; for each of the multiple antenna radiating elements 104, average all sampled phases of the at least one given sampled phase and average all sampled gains of the at least one given sampled gain to obtain the estimated relative phase and the estimated relative gain for said antenna radiating element 104 of the multiple antenna radiating elements 104; and/or output the estimated relative phase and the estimated relative gain for each of the multiple antenna radiating elements 104.

Figure 2A:
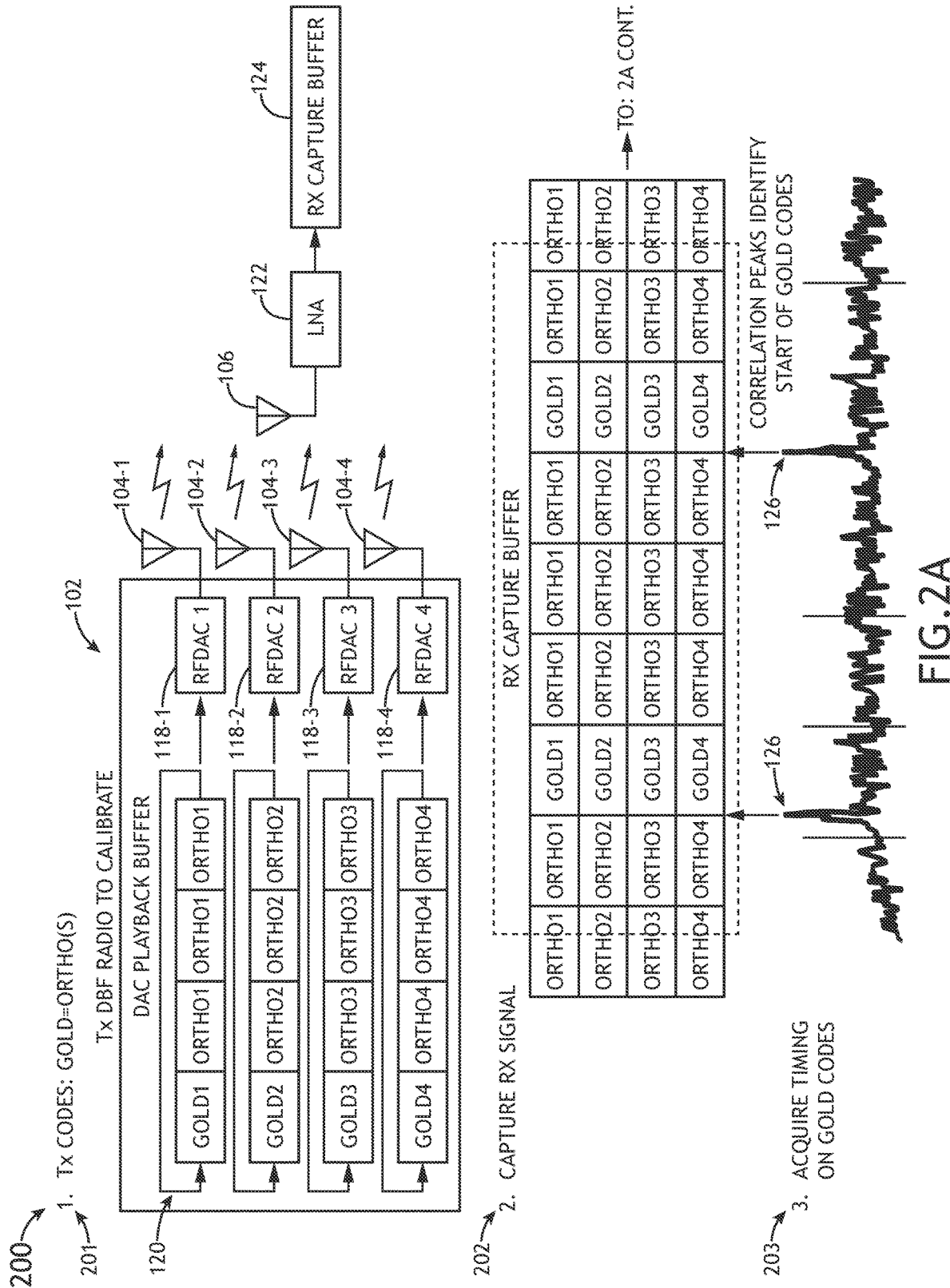
FIG. 2A is a diagram of an exemplary embodiment of a method according to the inventive concepts disclosed herein.
Figure 2A:
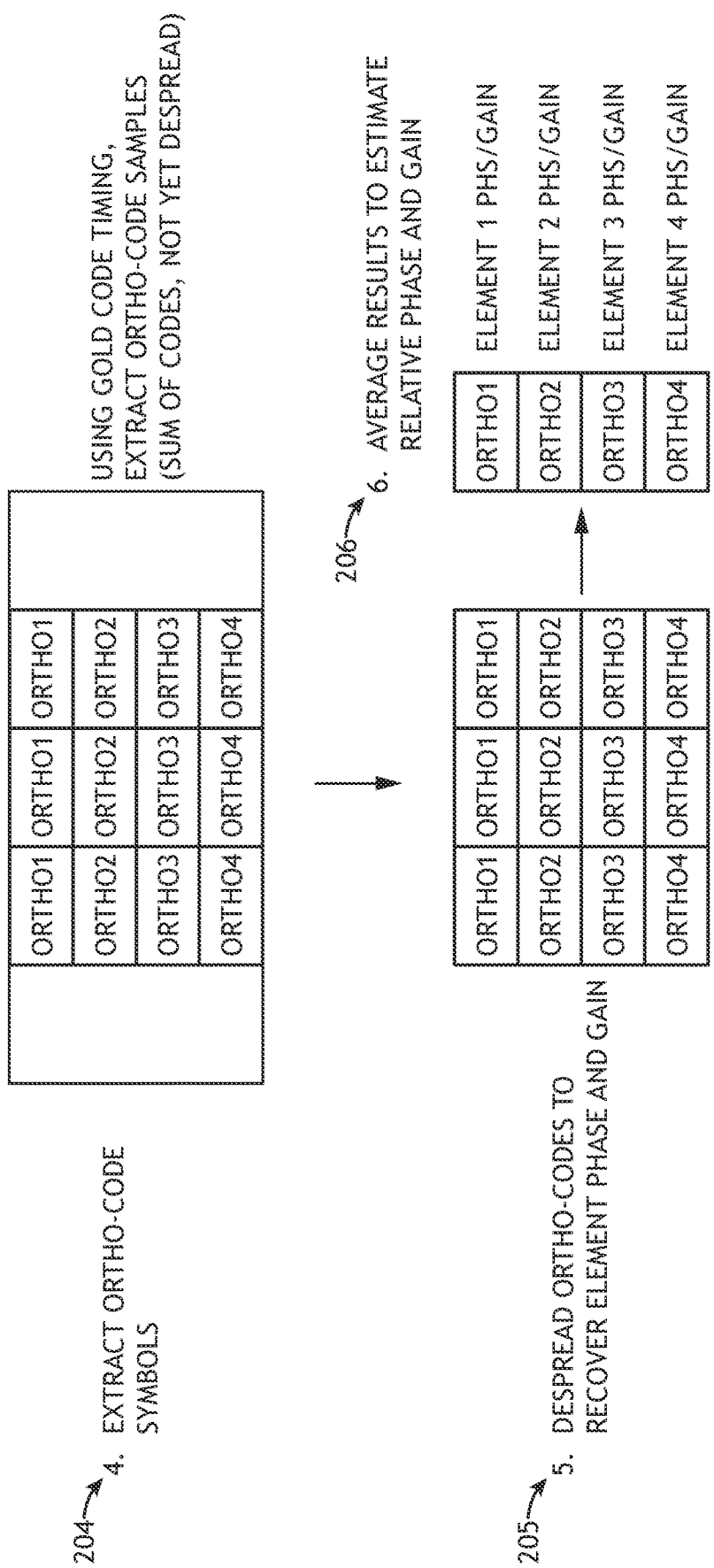

In some embodiments, the DBF antenna array 102 may include at least one calibration support circuit 138 configured to route a copy of the set of calibration signals to the at least one first processor 108-1, wherein the at least one calibration support circuit 138 may be electrically positioned between (a) the multiple antenna radiating elements 104 and (b) one or more of the at least one first processor 108-1, For example, the at least one calibration support circuit 138 may be electrically positioned between (a) the multiple antenna radiating elements 104 and (b) RFDACs (e.g., 118, as shown in FIG. 2A). For example, the one or more of the at least one first processor 108-1 may be configured to feed the set of calibration signals to the multiple antenna radiating elements 104. For example, the at least one first processor 108-1 may be communicatively coupled to the at least one calibration support circuit 138, wherein each timing acquisition sequence may include a given Gold code, wherein each second sequence may include at least one given code (e.g., at least one orthogonal code). For example, the at least one first processor 108-1 may be configured to: receive the set of calibration signals from the at least one calibration support circuit 138; acquire a timing of all of the Gold codes within the set of calibration signals; at least by using the timing of all of the Gold codes, extract a code sample from each of the at least one given code for each second sequence; despread the code samples to recover at least one given sampled phase and at least one given sampled gain for each of the multiple antenna radiating elements 104; for each of the multiple antenna radiating elements 104, average all sampled phases of the at least one given sampled phase and average all sampled gains of the at least one given sampled gain to obtain the estimated relative phase and the estimated relative gain for said antenna radiating element 104 of the multiple antenna radiating elements 104; and/or output the estimated relative phase and the estimated relative gain for each of the multiple antenna radiating elements 104.

In some embodiments, the at least one first processor 108-1 may be communicatively coupled to the DBF antenna array 102.

In some embodiments, the at least one second processor 108-2 may be communicatively coupled to the DBF antenna array 102. For example, the at least one second processor 108-2 may be configured to: obtain, from the at least one first processor 108-1 via a transmission from the antenna 106 to the DBF antenna array 102, the estimated relative phase and the estimated relative gain for each of the multiple antenna radiating elements; and/or output instructions to calibrate the multiple antenna radiating elements 104 by using the estimated relative phase and the estimated relative gain for each of the multiple antenna radiating elements 104.

Referring now to FIG. 2A, an exemplary flow diagram associated with a method 200 of performing a calibration of a DBF antenna array 102 of some embodiments, according to the inventive concepts disclosed herein, is depicted. As exemplarily shown in FIG. 2A, the DBF antenna array 102 includes four antenna radiating elements 104-1 through 104-4, four RDACs 118-1 through 118-4, and an array 120 of four DAC playback buffers. Additionally, for example, some embodiments may include performing one more instances of the method 200 iteratively, concurrently, and/or sequentially. Additionally, for example, at least some of the steps of the method 200 may be performed in parallel and/or concurrently. Additionally, in some embodiments, at least some of the steps of the method 200 may be performed non-sequentially.

A step 201 may include simultaneously transmitting, by a DBF antenna array 102 to an antenna 106, a set of calibration signals on multiple (e.g., some or all) antenna radiating elements 104 of the antenna radiating elements 104. The multiple antenna radiating elements 104 including the first, second, third, and fourth antenna radiating elements 104-1, 104-2, 104-3, 104-4. For example, each calibration signal of the set of calibration signals may include a given timing acquisition sequence (e.g., including a Gold code) and a given second sequence. For example, each given second sequence may be used to measure a phase and a gain of a given antenna radiating element 104 of the antenna radiating elements 104. For example, the given second sequence may include at least one orthogonal code (e.g., at least one Hadamard code).

A step 202 may include receiving, by a receive device (e.g., including the antenna 106, at least one first processor 108-1, at least one receive buffer (e.g., 124), a receiver, and/or a radio 110), a timing of all of the Gold codes within the set of calibration signals.

A step 203 may include acquiring, by the at least one processor 108-1, a timing of all of the Gold codes within the set of calibration signals. For example, correlation peaks of the Gold codes may identify a start of the Gold codes.

A step 204 may include at least by using the timing of all of the Gold codes, extracting, by the at least one first processor 108-1, a code sample from each of the at least one given code for each second sequence. For example, the extracting may include using Gold code timing to extract orthogonal code samples.

A step 205 may include despreading, by the at least one first processor 108-1, the code samples to recover at least one given sampled phase and at least one given sampled gain for each of the multiple antenna radiating elements 104.

A step 206 may include, for each of the multiple antenna radiating elements 104, average all sampled phases of the at least one given sampled phase and average all sampled gains of the at least one given sampled gain to obtain the estimated relative phase and the estimated relative gain for said antenna radiating element 104 of the multiple antenna radiating elements 104.

Further, the method 200 may include any of the operations disclosed throughout.

Figure 2B:
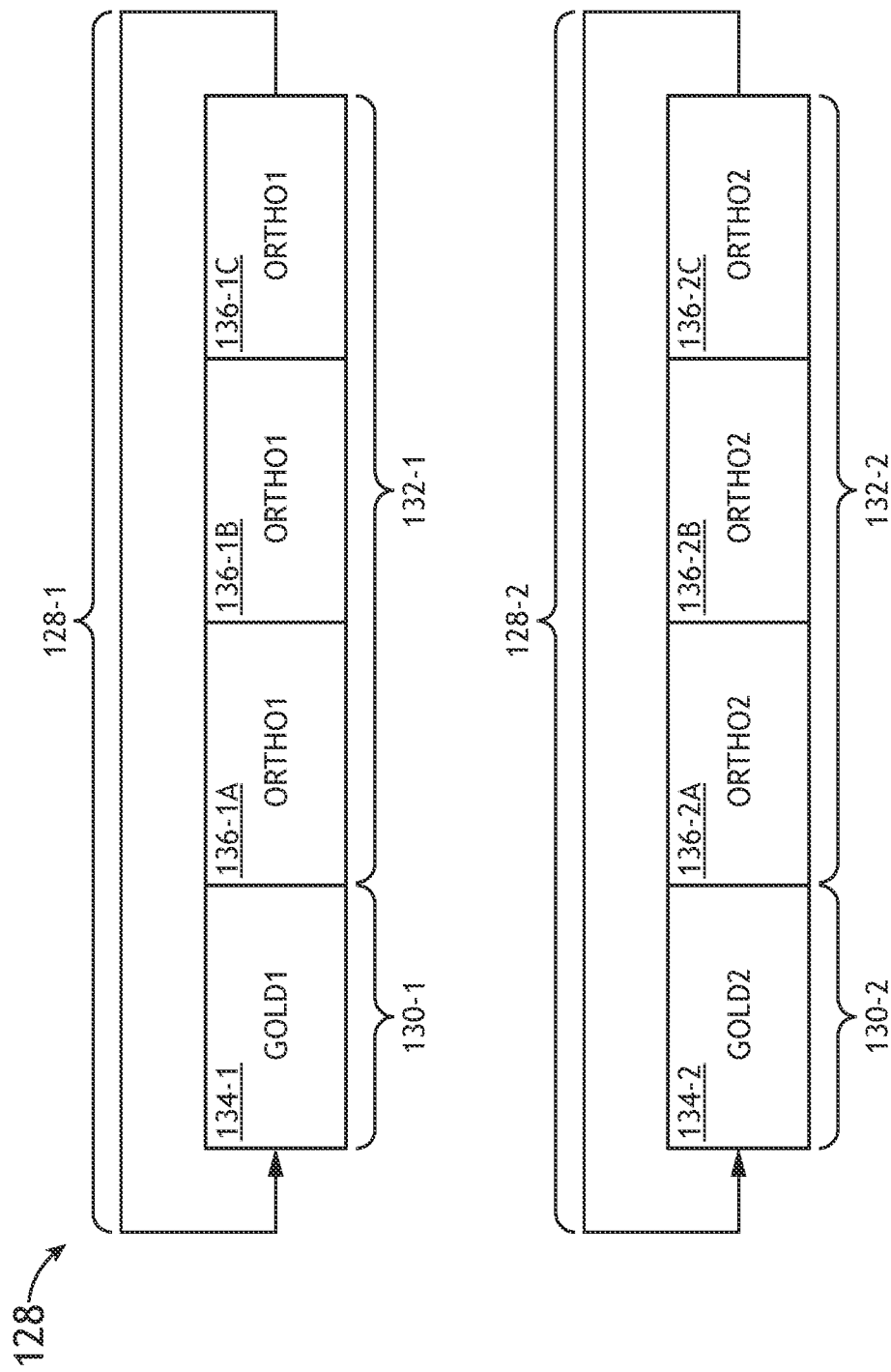
FIG. 2B is an exemplary set of calibration signals used in the system of FIG. 1 and method of FIG. 2A according to the inventive concepts disclosed herein.

Referring now to FIG. 2B, an exemplary set 128 of calibration signals of some embodiments, according to the inventive concepts disclosed herein, is depicted. The set 128 of calibration signals may include any suitable number of calibration signals (e.g., 128-1, 128-2) depending on the number of antenna radiating elements 104 (or subarrays of antenna radiating elements), e.g., such that the set 128 of calibration signals includes a calibration signal (e.g., 128-1 or 128-2) for each of the antenna radiating elements 104. Each calibration signal (e.g., 128-1, 128-2) of the set 128 of calibration signals may include a given timing acquisition sequence (e.g., 130-1 or 130-2) (e.g., including a Gold code (e.g., 134-1 or 134-2)) and a given second sequence (e.g., 132-1 or 132-2). For example, each given second sequence (e.g., 132-1 or 132-2) may be used to measure a phase and a gain of a given antenna radiating element 104 of the antenna radiating elements 104. For example, the given second sequence (e.g., 132-1 or 132-2) may include at least one orthogonal code (e.g., at least one Hadamard code) (e.g., (a) 136-1A, 136-1B, and 136-1C or (b) 136-3A, 136-2B, and 136-2C).

Figure 3A:
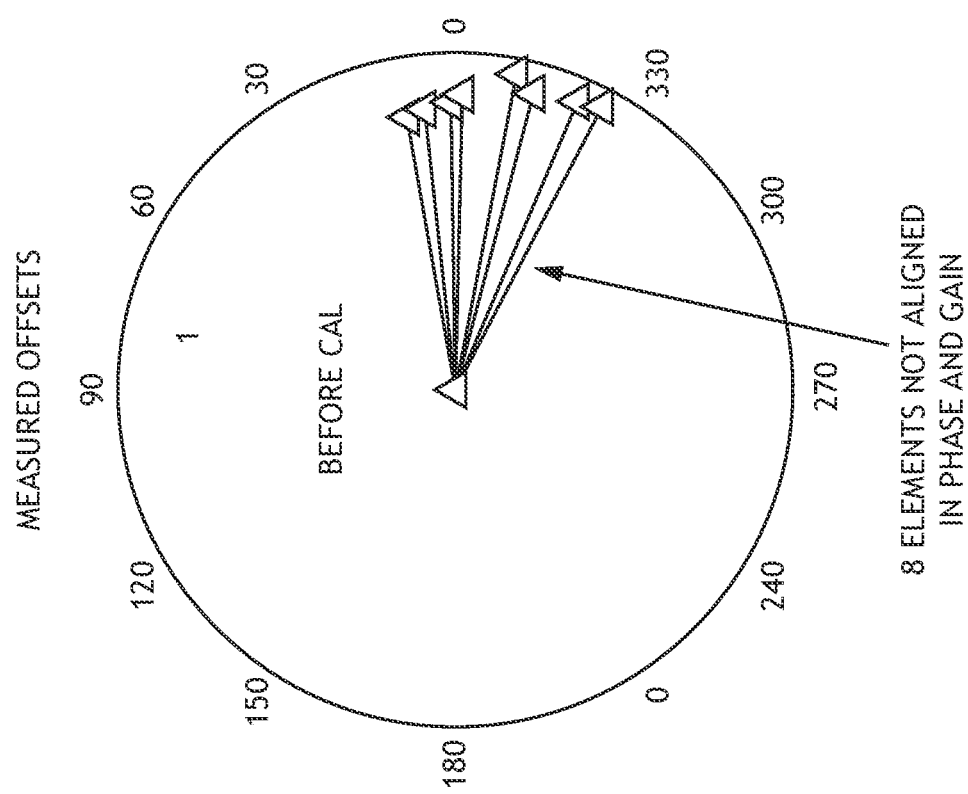
FIGS. 3A and 3B show exemplary graphs associated with an exemplary embodiment of the system of FIG. 1 according to the inventive concepts disclosed herein.
Figure 3B:
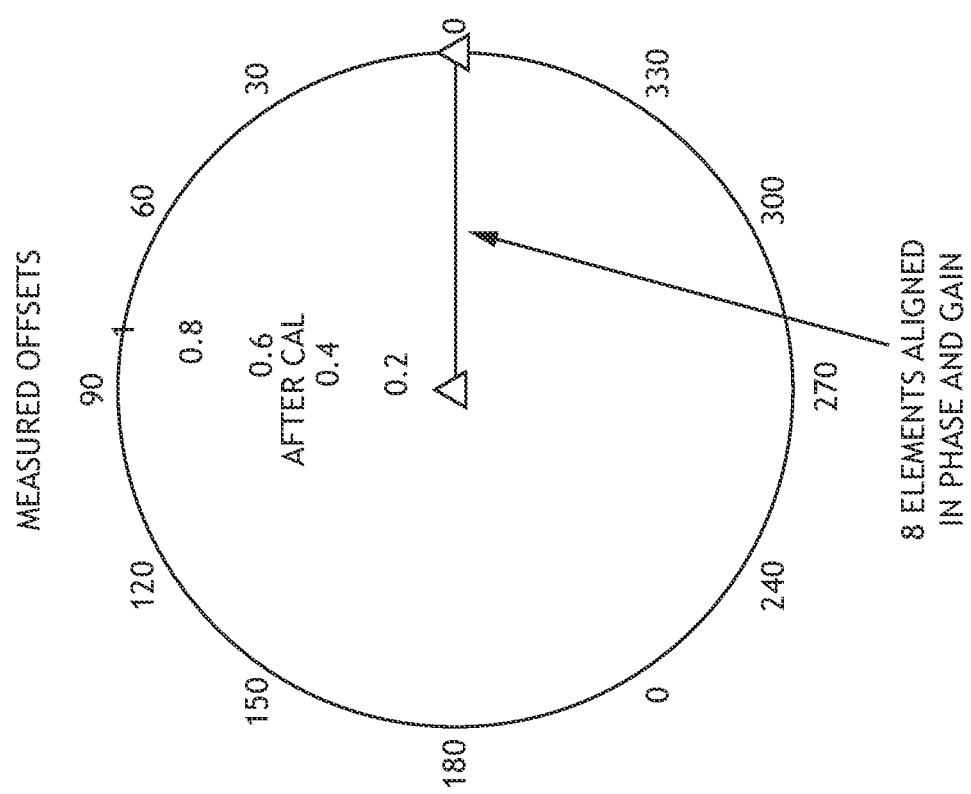

Referring now to FIGS. 3A-3B, exemplary graphs of measured offsets (e.g., gain and phase offsets) associated with an exemplary embodiment of antenna radiating elements 104 of a DBF antenna array 102 are depicted. FIG. 3A shows an exemplary graph of measured offsets before the DBF antenna array 102 is calibrated; the antenna radiating elements 104 in FIG. 3A are not aligned in phase and gain. FIG. 3B shows an exemplary graph of measured offsets after the DBF antenna array 102 is calibrated; the antenna radiating elements 104 in FIG. 3B are aligned in phase and gain.

Still referring to FIGS. 3A-3B, a calibration process of some embodiments has been successfully tested and performed in an anechoic chamber 116. The test included a DBF antenna array 102 included eight antenna radiating elements 104 in the anechoic chamber 116. The calibration process (including filling the rx capture buffer 124, data transfer, and processing time) was completed in less than 25 microseconds. The set 128 of calibration signals included eight calibration signals. Each calibration signal, associated with a given antenna radiating element 104, included a timing sequence having one Gold code and a second sequence having two orthogonal codes. The rx capture buffer 124 was less than 400 symbols long, which was long enough to contain two repetitions of the set 128 of calibration signals. The test used a symbol rate of 19.2 MHz, and the rx capture buffer 124 spanned less than 25 microseconds.

Figure 4:
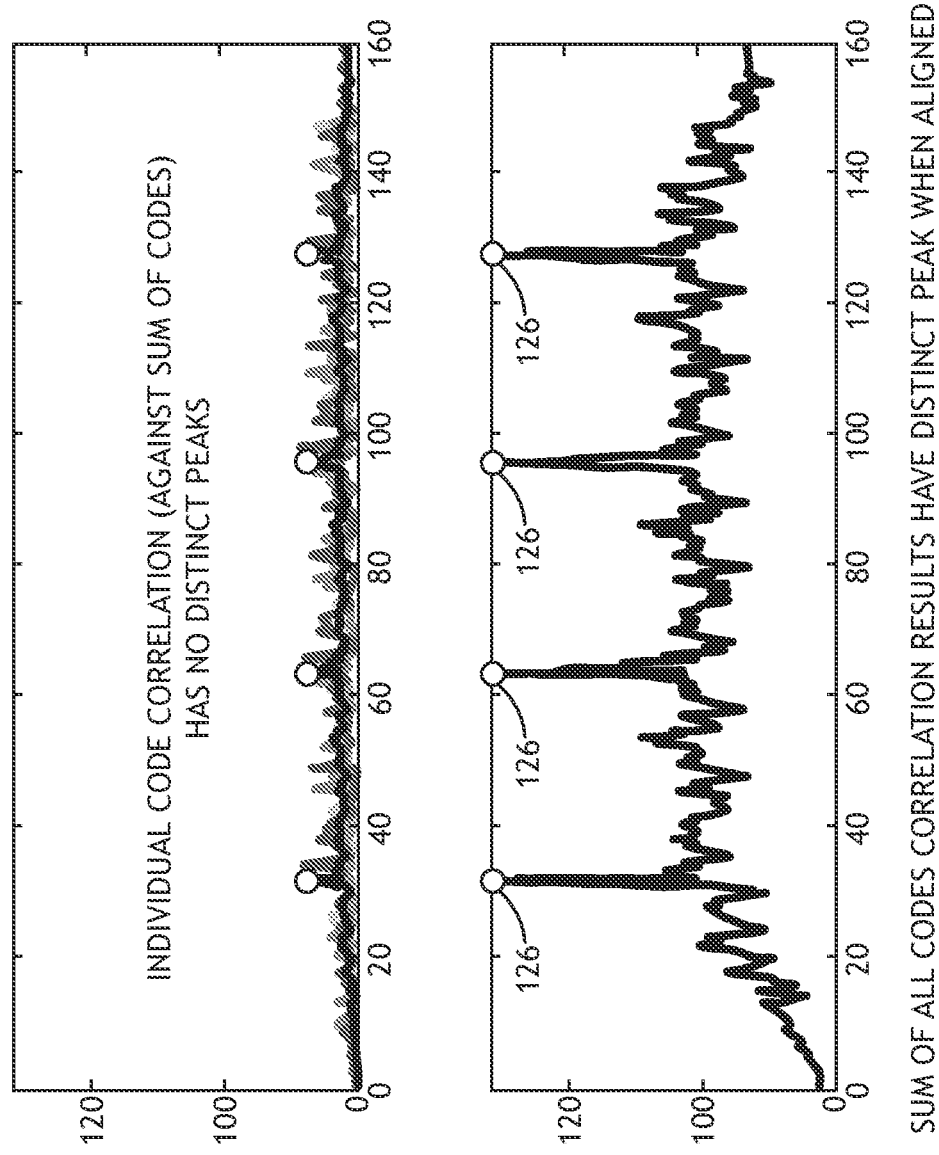
FIG. 4 shows exemplary graphs associated with an exemplary embodiment of the system of FIG. 1 according to the inventive concepts disclosed herein.

Referring now to FIG. 4, exemplary graphs of repeated sets 128 of calibration codes having Gold codes associated with an exemplary embodiment are depicted. As shown in the top graph of FIG. 4, an individual code correlation (e.g., against a sum of codes) has no distinct peaks. As shown in the bottom graph of FIG. 4, a sum (e.g., a sum of magnitudes of individual correlations) of all code's correlations results have distinct correlation peaks 126 when aligned.

Figure 5:
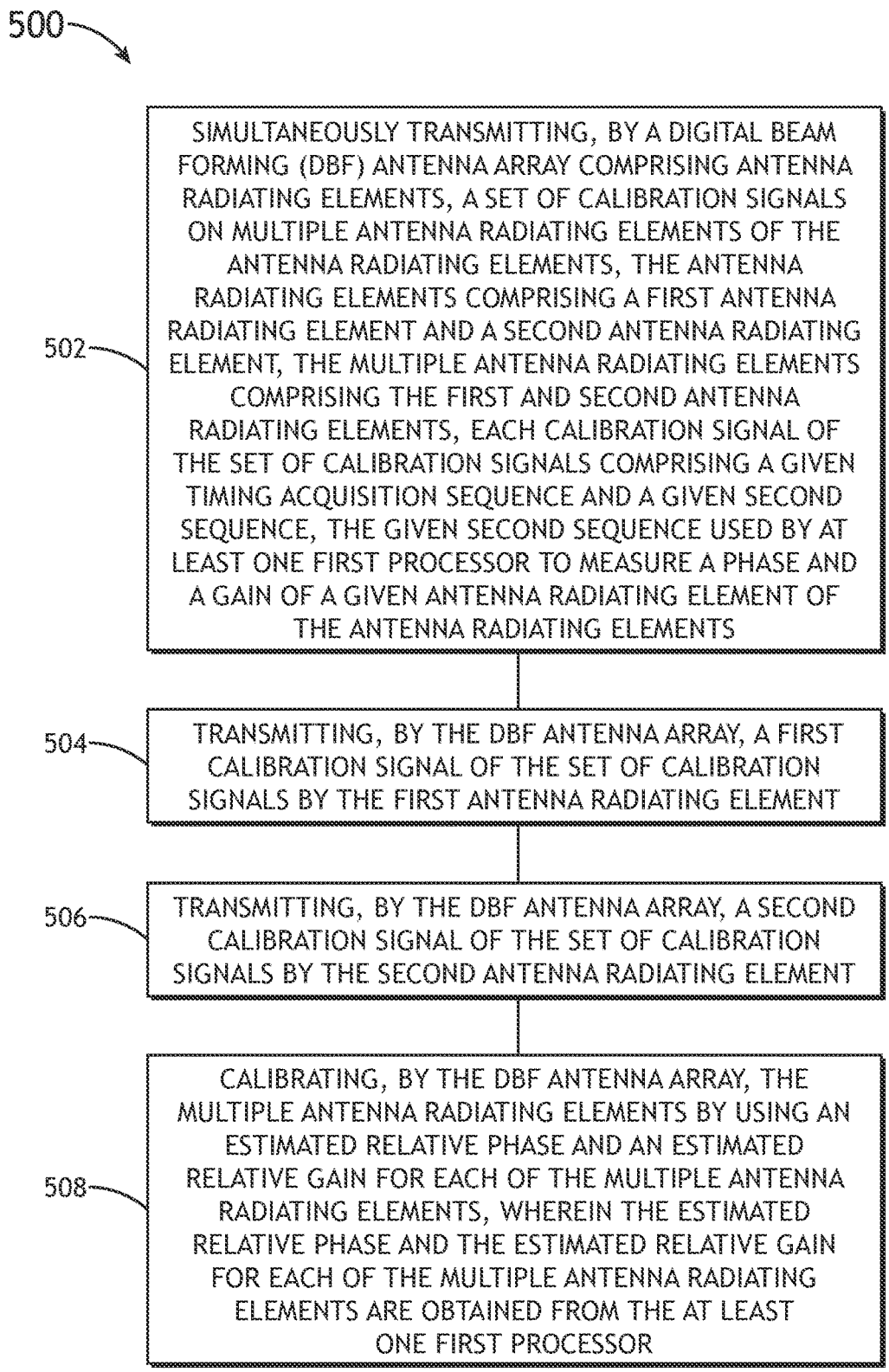
FIG. 5 is a diagram of an exemplary embodiment of a method according to the inventive concepts disclosed herein.

Referring now to FIG. 5, an exemplary embodiment of a method 500 according to the inventive concepts disclosed herein may include one or more of the following steps. Additionally, for example, some embodiments may include performing one more instances of the method 500 iteratively, concurrently, and/or sequentially. Additionally, for example, at least some of the steps of the method 500 may be performed in parallel and/or concurrently. Additionally, in some embodiments, at least some of the steps of the method 500 may be performed non-sequentially.

A step 502 may include simultaneously transmitting, by a digital beam forming (DBF) antenna array comprising antenna radiating elements, a set of calibration signals on multiple antenna radiating elements of the antenna radiating elements, the antenna radiating elements comprising a first antenna radiating element and a second antenna radiating element, the multiple antenna radiating elements comprising the first and second antenna radiating elements, each calibration signal of the set of calibration signals comprising a given timing acquisition sequence and a given second sequence, the given second sequence used by at least one first processor to measure a phase and a gain of a given antenna radiating element of the antenna radiating elements.

A step 504 may include transmitting, by the DBF antenna array, a first calibration signal of the set of calibration signals by the first antenna radiating element.

A step 506 may include transmitting, by the DBF antenna array, a second calibration signal of the set of calibration signals by the second antenna radiating element.

A step 508 may include calibrating, by the DBF antenna array, the multiple antenna radiating elements by using an estimated relative phase and an estimated relative gain for each of the multiple antenna radiating elements, wherein the estimated relative phase and the estimated relative gain for each of the multiple antenna radiating elements are obtained from the at least one first processor Further, the method 500 may include any of the operations disclosed throughout.

As will be appreciated from the above, embodiments of the inventive concepts disclosed herein may be directed to a method and a system configured calibrate a digital beam forming (DBF) antenna array (e.g., an active phased array antenna, commonly referred to as an ESA).

As used throughout and as would be appreciated by those skilled in the art, "at least one non-transitory computer-readable medium" may refer to as at least one non-transitory computer-readable medium (e.g., at least one computer-readable medium implemented as hardware; e.g., at least one non-transitory processor-readable medium, at least one memory (e.g., at least one nonvolatile memory, at least one volatile memory, or a combination thereof; e.g., at least one random-access memory, at least one flash memory, at least one read-only memory (ROM) (e.g., at least one electrically erasable programmable read-only memory (EEPROM)), at least one on-processor memory (e.g., at least one on-processor cache, at least one on-processor buffer, at least one on-processor flash memory, at least one on-processor EEPROM, or a combination thereof), at least one storage device (e.g., at least one hard-disk drive, at least one tape drive, at least one solid-state drive, at least one flash drive, at least one readable and/or writable disk of at least one optical drive configured to read from and/or write to the at least one readable and/or writable disk, or a combination thereof).

As used throughout, "at least one" means one or a plurality of; for example, "at least one" may comprise one, two, three, . . . , one hundred, or more. Similarly, as used throughout, "one or more" means one or a plurality of; for example, "one or more" may comprise one, two, three, . . . , one hundred, or more. Further, as used throughout, "zero or more" means zero, one, or a plurality of; for example, "zero or more" may comprise zero, one, two, three, . . . , one hundred, or more.

In the present disclosure, the methods, operations, and/or functionality disclosed may be implemented as sets of instructions or software readable by a device. Further, it is understood that the specific order or hierarchy of steps in the methods, operations, and/or functionality disclosed are examples of exemplary approaches. Based upon design preferences, it is understood that the specific order or hierarchy of steps in the methods, operations, and/or functionality can be rearranged while remaining within the scope of the inventive concepts disclosed herein. The accompanying claims may present elements of the various steps in a sample order, and are not necessarily meant to be limited to the specific order or hierarchy presented.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed is:

1. A system, comprising:
   at least one first processor; and
   an antenna array comprising antenna radiating elements, the antenna radiating elements comprising a first antenna radiating element and a second antenna radiating element, wherein the antenna array is a digital beam forming (DBF) antenna array, wherein the antenna array is configured to:
   simultaneously transmit a set of calibration signals on multiple antenna radiating elements of the antenna radiating elements, the multiple antenna radiating elements comprising the first and second antenna radiating elements, each calibration signal of the set of calibration signals comprising a given timing acquisition sequence and a given second sequence, the given second sequence used by the at least one first processor to measure a phase and a gain of a given antenna radiating element of the antenna radiating elements;
   transmit a first calibration signal of the set of calibration signals by the first antenna radiating element;
   transmit a second calibration signal of the set of calibration signals by the second antenna radiating element; and
   calibrate the multiple antenna radiating elements by using an estimated relative phase and an estimated relative gain for each of the multiple antenna radiating elements, wherein the estimated relative phase and the estimated relative gain for each of the multiple antenna radiating elements are obtained from the at least one first processor;
   wherein a timing acquisition sequence of the first calibration signal comprises a first Gold code, wherein a timing acquisition sequence of the second calibration signal comprises a tone and lacks a Gold code.

2. The system of claim 1, wherein timing acquisition sequences of the set of calibration signals have at least one of an (a) autocorrelation properties such that the timing acquisition sequences have a distinct correlation peak and/or (b) cross-correlation properties.

3. The system of claim 1, wherein each second sequence comprises at least one given orthogonal code.

4. The system of claim 1, wherein the DBF antenna is configured to simultaneously transmit, to an antenna, the set of calibration signals, wherein the DBF antenna array and the antenna are not time synchronized.

5. The system of claim 1, wherein the set of calibration signals has a constant envelope waveform.

6. The system of claim 1, wherein the DBF antenna array is further configured to repeatedly transmit sets of calibration signals at least until the DBF antenna array obtains the estimated relative phase and the estimated relative gain for each of the multiple antenna radiating elements, wherein each of the sets of calibration signals is the same as the set of calibration signals.

7. The system of claim 1, wherein the DBF antenna is configured to simultaneously transmit, to an antenna, the set of calibration signals, wherein the DBF antenna array or the antenna is in motion relative to the other of the DBF antenna array and the antenna.

8. The system of claim 7, wherein the calibration of the multiple antenna radiating elements by using the estimated relative phase and the estimated relative gain for each of the multiple antenna radiating elements takes into account a frequency offset resulting from the relative motion and/or an orientation between the DBF antenna array and the antenna.

9. The system of claim 1, wherein the DBF antenna is configured to simultaneously transmit, to an antenna, the set of calibration signals, wherein the DBF antenna array or the antenna is installed on a vehicle.

10. The system of claim 1, wherein the DBF antenna array is further configured to perform a field calibration of the multiple antenna radiating elements by using the estimated relative phase and the estimated relative gain for each of the multiple antenna radiating elements.

11. The system of claim 1, wherein the calibration of the multiple antenna radiating elements occurs in real-time relative to the transmission of the set of calibration signals by the DBF antenna array.

12. The system of claim 1, wherein the DBF antenna array comprises at least one calibration support circuit configured to route a copy of the set of calibration signals to the at least one first processor, wherein the at least one calibration support circuit is electrically positioned between (a) the multiple antenna radiating elements and (b) one or more of the at least one first processor, the one or more of the at least one first processor being configured to feed the set of calibration signals to the multiple antenna radiating elements.

13. The system of claim 1, wherein the DBF antenna is configured to simultaneously transmit, to an antenna, the set of calibration signals, further comprising at least one second processor communicatively coupled to the DBF antenna array, wherein the at least one second processor is configured to:
  obtain, from the at least one first processor via a transmission from the antenna to the DBF antenna array, the estimated relative phase and the estimated relative gain for each of the multiple antenna radiating elements; and
  output instructions to calibrate the multiple antenna radiating elements by using the estimated relative phase and the estimated relative gain for each of the multiple antenna radiating elements.

14. A method, comprising:
  simultaneously transmitting, by a digital beam forming (DBF) antenna array comprising antenna radiating elements, a set of calibration signals on multiple antenna radiating elements of the antenna radiating elements, the antenna radiating elements comprising a first antenna radiating element and a second antenna radiating element, the multiple antenna radiating elements comprising the first and second antenna radiating elements, each calibration signal of the set of calibration signals comprising a given timing acquisition sequence and a given second sequence;
  using, by at least one first processor, the given second sequence to measure a phase and a gain of a given antenna radiating element of the antenna radiating elements;
  transmitting, by the DBF antenna array, a first calibration signal of the set of calibration signals by the first antenna radiating element;
  transmitting, by the DBF antenna array, a second calibration signal of the set of calibration signals by the second antenna radiating element;
  obtaining, by the DBF antenna array, an estimated relative phase and an estimated relative gain for each of the multiple antenna radiating elements, wherein the estimated relative phase and the estimated relative gain for each of the multiple antenna radiating elements are obtained from the at least one first processor; and
  calibrating, by the DBF antenna array, the multiple antenna radiating elements by using the estimated relative phase and the estimated relative gain for each of the multiple antenna radiating elements;
  wherein a timing acquisition sequence of the first calibration signal comprises a first Gold code, wherein a timing acquisition sequence of the second calibration signal comprises a tone and lacks a Gold code.

* * * * *